April 4, 1944.　　　J. L. JONES ET AL　　　2,346,031
AREA MEASURING MACHINE
Filed July 1, 1941　　　5 Sheets-Sheet 1

INVENTORS:
John L. Jones
and James W. Farmer,
BY H. McCready,
their atty.

April 4, 1944. J. L. JONES ET AL 2,346,031
AREA MEASURING MACHINE
Filed July 1, 1941  5 Sheets-Sheet 2
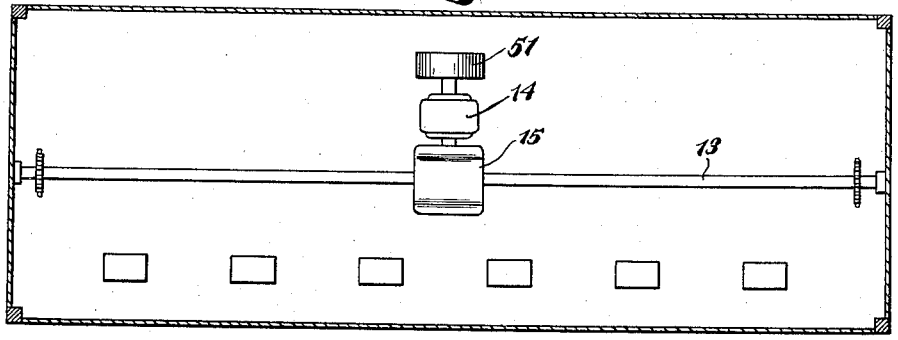
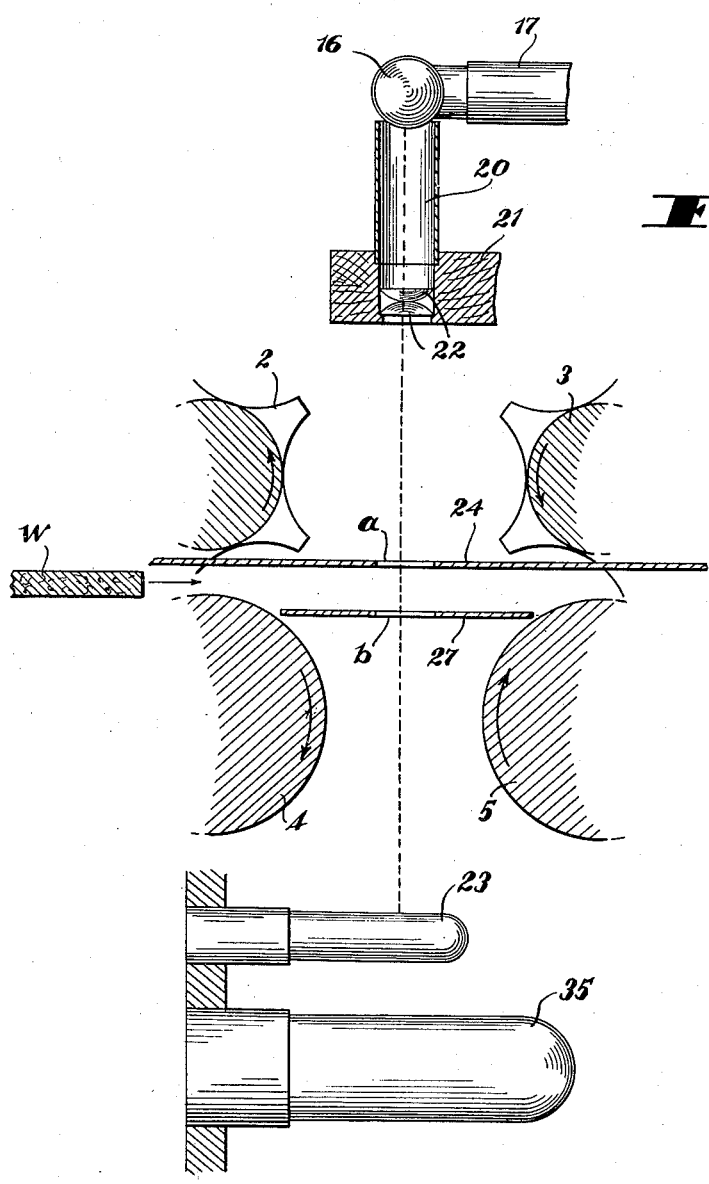
INVENTORS:
John L. Jones
and James W. Harner,
BY H. McCready,
their atty.

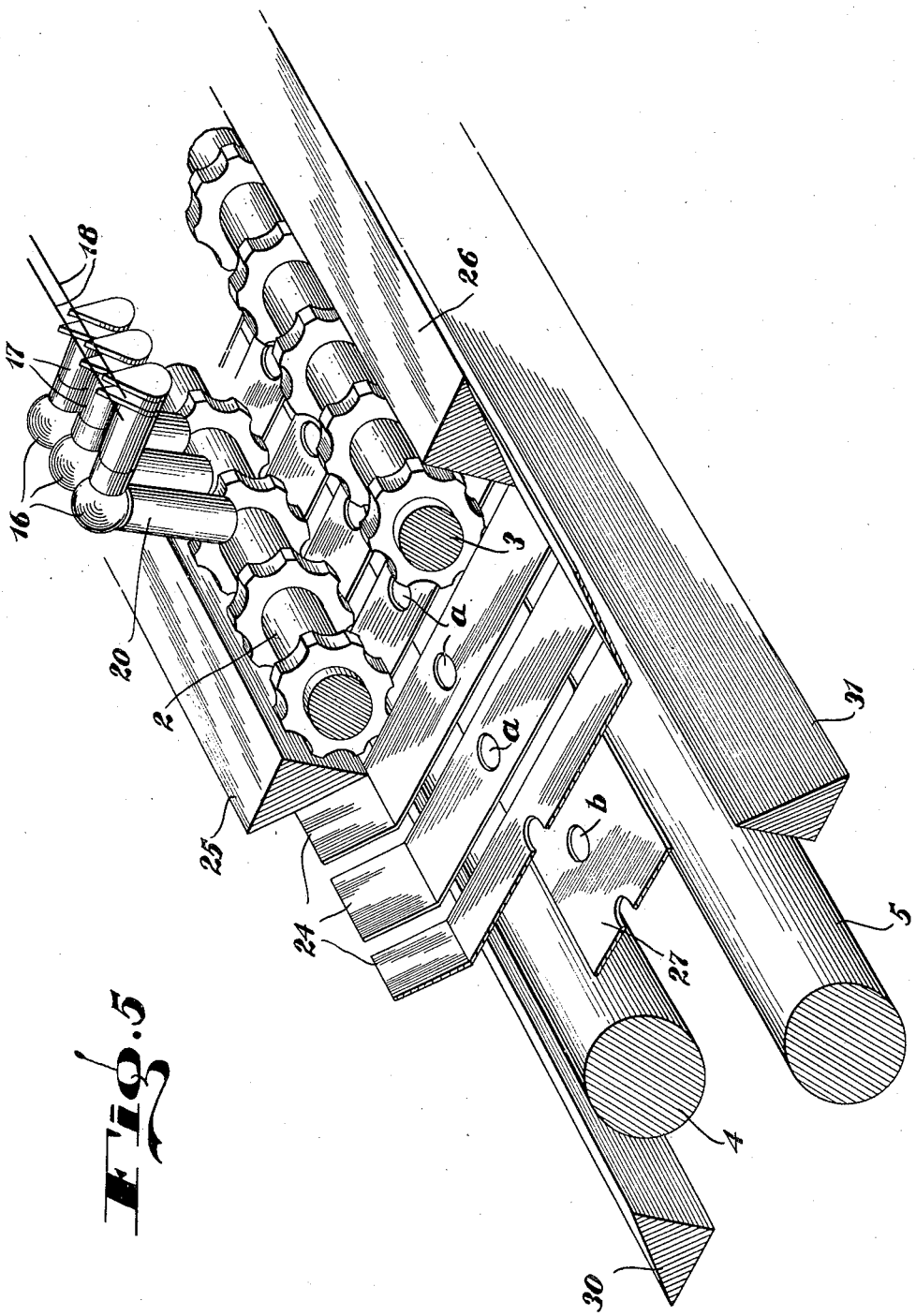

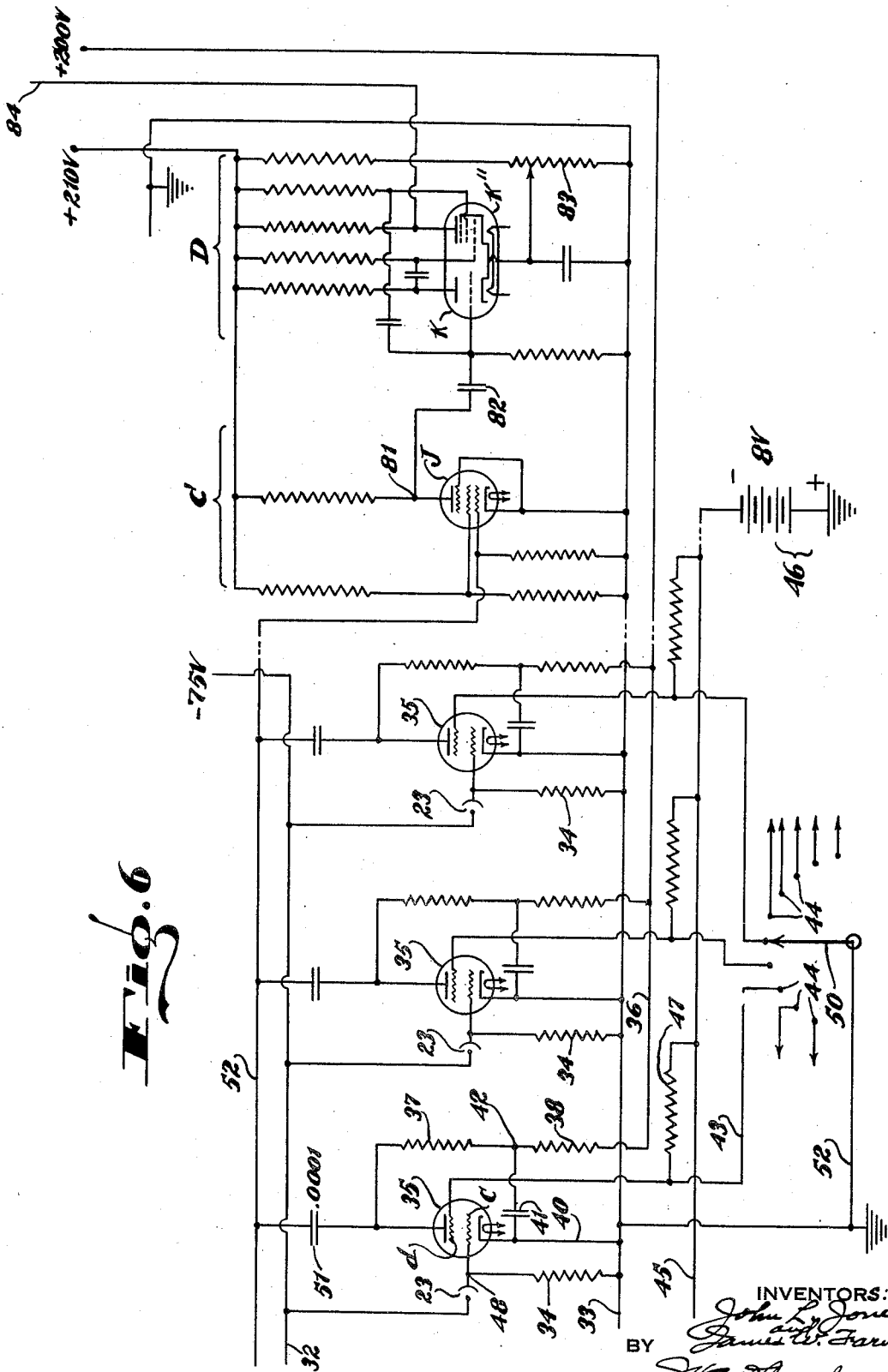

April 4, 1944.  J. L. JONES ET AL  2,346,031
AREA MEASURING MACHINE
Filed July 1, 1941  5 Sheets-Sheet 5
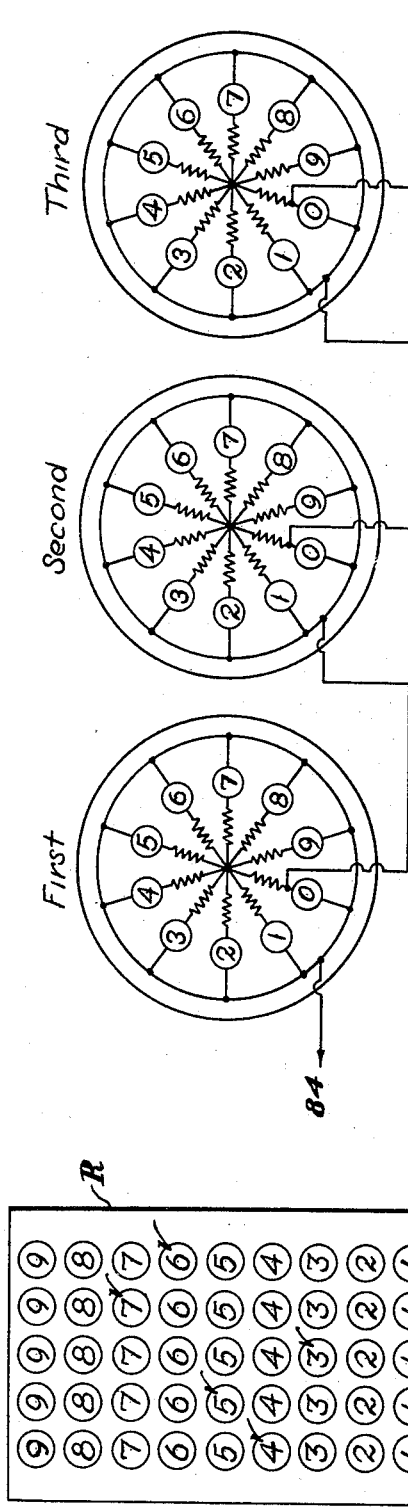
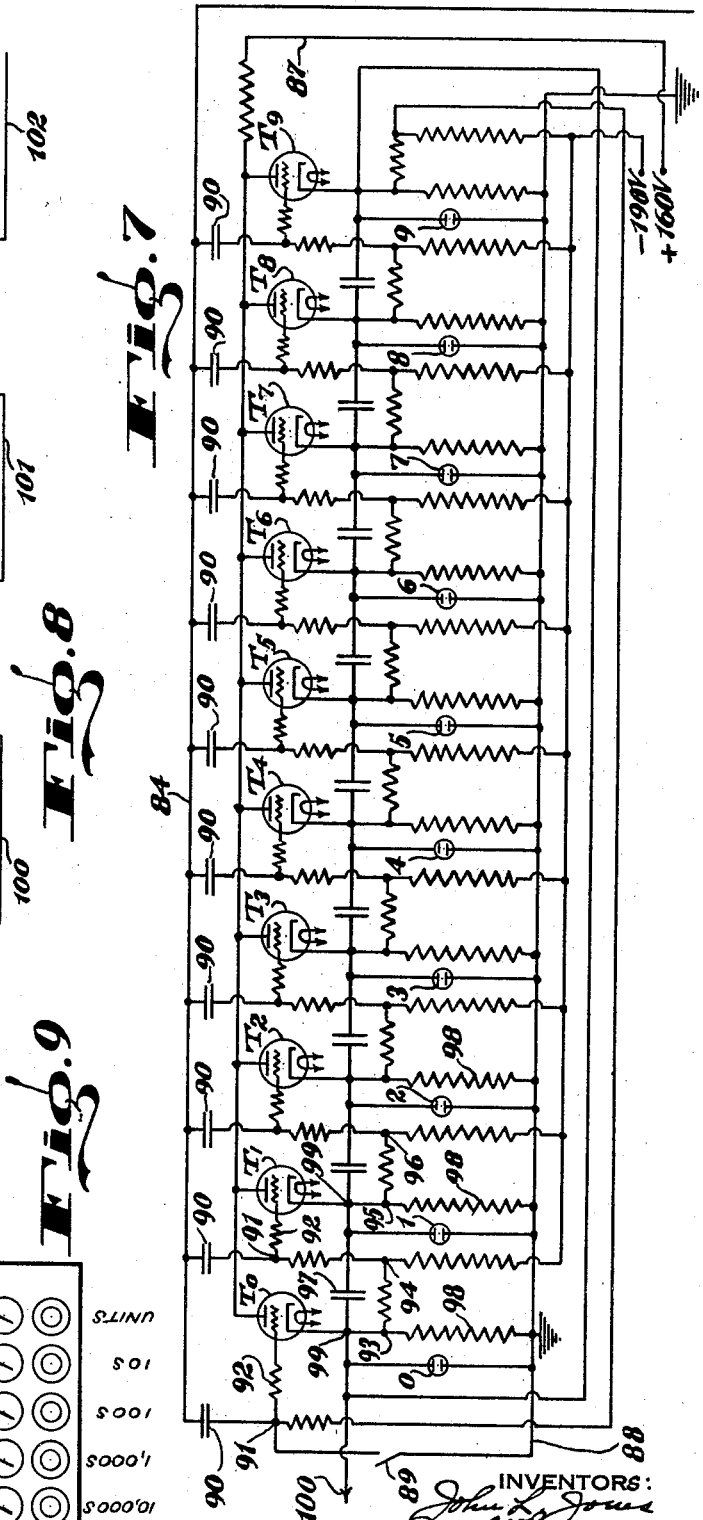
INVENTORS:
John L. Jones
James W. Farmer
BY
their Atty.

Patented Apr. 4, 1944

2,346,031

UNITED STATES PATENT OFFICE 2,346,031

AREA MEASURING MACHINE

John L. Jones, Billerica, and James W. Farmer, Watertown, Mass., assignors to Stockton Profile Gauge Corporation, Lowell, Mass., a corporation of Massachusetts Application July 1, 1941, Serial No. 400,682

12 Claims. (Cl. 33—123)

In a pending application Ser. No. 353,786, filed August 23, 1940, we have shown and described a novel method of measuring areas and a machine operating in accordance with that method. The machine there illustrated includes two sets of feed rolls for feeding sheet material, the area of which is to be measured. While it is so fed a scanning beam is reciprocated across the surface transversely to the direction of feed of the work piece, and a photo-tube is reciprocated in synchronism with it so that it is always positioned to receive the beam when the latter is not intercepted by the work. Operatively connected with the photo-tube is an electronic counting system and a control circuit therefor which are so organized as to integrate current pulses created simultaneously with the scanning of successive increments of area into an expression of the total area of the scanned surface of the work.

While this machine has proved exceptionally satisfactory and it represents an important advance in this art, it has been found that in attempting to use it at speeds considerably higher than those mentioned in said application an important limiting factor is introduced by the necessity for reciprocating the photo-tube and the scanning lamp.

It is the chief object of the present invention to improve and perfect machines for measuring areas through the use of photo-tubes, or similar light sensitive elements, and sources of light adapted to cooperate with such elements. In particular, the invention aims to avoid the necessity for reciprocating either the light sources or the photo-tubes used with them, and thus to simplify the operations required in making these area measurements and correspondingly simplifying, also, the character of the mechanisms employed for this purpose. In addition, the invention aims to increase the speed with which these area measuring operations can be performed while still retaining at least as high a degree of accuracy as those realized with our earlier forms of apparatus designed for this purpose.

The nature of the invention will be readily understood from the following description when read in connection with the accompanying drawings, and the novel features will be particularly pointed out in the appended claims.

In the drawings,

Fig. 3 is a horizontal, sectional view approximately on the line 3—3, Fig. 1;

Fig. 4 is a vertical, sectional view transversely of the feed rolls, and somewhat diagrammatic in character, showing the feed rolls, the lamps and photo-tubes in their cooperative relation to each other;

Fig. 5 is an angular view on a larger scale of the feed rolls, lamps, and parts immediately associated therewith;

Fig. 6 is a diagram of the electrical connections, including the photo-tubes and the control circuit for the counting ring;

Fig. 7 is a diagrammatic view of the counting ring or counting circuit per se;

Fig. 8 is a much simplified diagram of the counting ring shown in Fig. 7 and illustrating its connection with additional counting rings of the same nature;

Fig. 9 is an elevation of the indicator portion of the counting system; and

Figure 1:
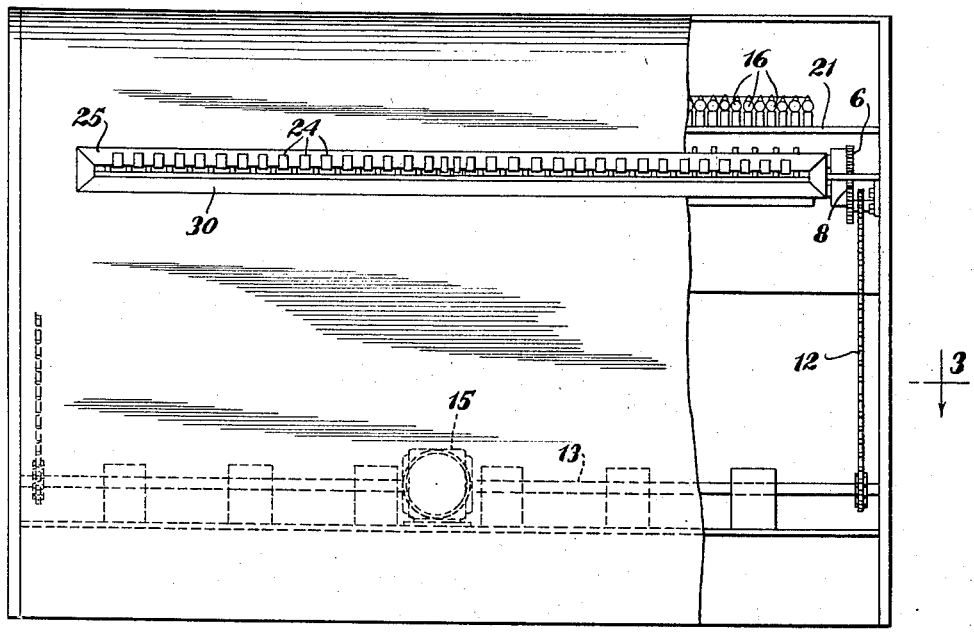
Figure 1 is a front elevation, with some parts broken away, of a machine constructed in accordance with this invention.

Referring first to Figs. 3 and 5, the machine here illustrated comprises front and rear pairs of horizontal feed rolls, the front pair comprising an upper fluted roll 2 and a lower smooth roll 4, while the rear pair consists of corresponding rolls 3 and 5. These rolls may be, and preferably are, constructed and supported in the manner disclosed more fully in our pending application above referred to so that they tend to exert a mild lateral stretching and smoothing action on the work. For this purpose also the rear rolls may, if desired, be driven at a very slightly higher speed than the front rolls so as to keep the work piece taut as it passes from one set of rolls to the next. Such an arrangement is of advantage in measuring leather and certain other sheet materials. All of these rolls are geared together at the opposite ends of the machine, the gearing at the right-hand end being best illustrated in Fig. 2. As there shown the front rolls are equipped with intermeshing gears 6 and 8 and the rear rolls with corresponding intermeshing gears 7 and 9, and the two lower gears mesh with and are driven by an intermediate gear (not shown) but which is secured fast on the shaft 10. This shaft is driven by sprocket and chain connections 12 from a lower shaft 13 which, in turn, is driven from an electric motor 14 through a speed reduction transmission unit 15. Similar connections operated from the unit 15 are provided to drive the opposite ends of the feed rolls.

According to the preferred method provided by this invention a work piece is interposed in a constantly illuminated scanning field, the beams of light intercepted by said work piece in contiguous equal units of area of said field are utilized in producing corresponding electrical pulses in a circuit, and these pulses are integrated into an expression of the area of the work piece. In the particular machine shown this method is practiced by feeding the work piece through a line of substantially contiguous parallel stationary beams of light, each beam illuminating a unit of area to be measured, and each beam so intercepted is caused to produce a change in the current flowing in the electric circuit, whereby a pulse is produced which is transmitted to a counting circuit.

For this purpose a series of electric lamps 16, Figs. 1, 2, 4 and 5, are mounted in fixed positions in a horizontal line directly over the space between the upper feed rolls. Each lamp is supported in a holder 17 and the lamps are connected into a suitable supply circuit as by means of the conductors 18, Fig. 5. Associated with each lamp is a vertical light tube 20, supported in an aperture in a holder 21 which extends the entire length of the frame. Also supported in the lower part of the same aperture is a lens or lenses 22 for focusing the beam of light issuing from the lamp on to a photo-tube 23, Fig. 4. Similar light tubes, lenses, and photo-tubes are provided for each of the other lamps 16, all arranged substantially as shown in Fig. 4.

In order better to control the beams and to shield the photo-tubes from stray light reflected from adjacent parts, a series of strips of metal 24, Fig. 5, are provided with upturned front and rear ends which are welded or otherwise secured to the inclined faces of front and rear frame pieces 25 and 26, respectively, between which the fluted upper rolls 2 and 3 are located. These strips are spaced apart sufficiently to provide passage for the flutes of the upper rolls, and each strip also is apertured, as shown at $a$, Fig. 5. A plate 27 also extends the length of the rolls and nearly across the space between the upper adjacent surfaces of the lower rolls 4 and 5 and it is provided with apertures $b$. Alternating beams from the lamps 16 pass through the apertures $a$, while the intermediate beams pass through the slots between adjacent strips 24. The beams from all of the lamps 16, however, pass through holes $b$ in the lower plate 27.

Figure 2:
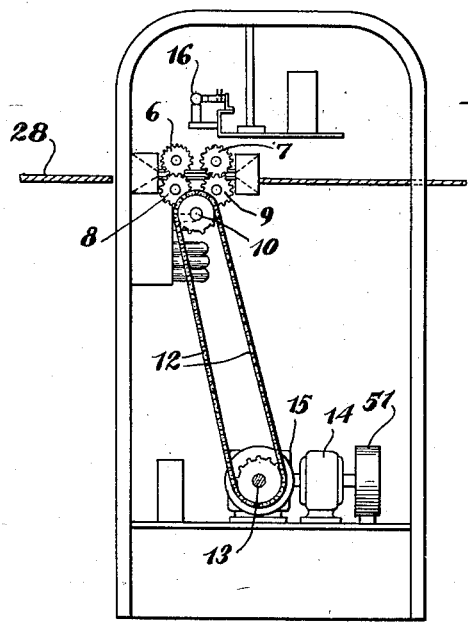
Fig. 2 is an end view of the machine shown in Fig. 1 with the end panel of the casing removed.

Usually a table, a portion of which is shown at 28 in Fig. 2, is placed immediately in front of the machine where it supports the work while it is fed into the nip of the front rolls 2 and 4. In order to assist in guiding successive work pieces into the bite of the rolls, a bar 30, Figs. 1 and 5, is located immediately in front of the lower roll 4 and is provided with a front surface, inclined oppositely to that of the bar 25, so that the two cooperate to form the inclined upper and lower edges of an inlet slot through which the work is advanced into engagement with the front rolls. Another bar 31 similar to the bar 30 is positioned at the rearward side of the roll 5. As shown in Fig. 4, a work piece, such as that indicated at W, passes between the shields or plates 24 and 27 as it is fed through the machine.

It will be evident from the foregoing that as a work piece of any kind, such as a cardboard pattern, a hide, sheet of leather, or the like, is fed into the machine, it is advanced at a predetermined rate by the two pairs of feed rolls. As its movement progresses through the scanning field and it intercepts the beams of light, it cuts off illumination at any instant from a number of photo-tubes, which number depends upon the width of the portion of the work piece in the scanning field at that instant. Naturally this number will vary as successive increments of length of the work piece are fed through the scanning field. Each lamp 16 and its cooperating photo-tube thus may be regarded as defining a certain unit of area of the scanning field. Assuming for convenience that the length of the work piece is in the direction of feed and that its width is at right angles to said direction, then a series of contiguous unit areas, cooperating to form a scanning strip extending entirely across the work widthwise thereof and of a definite length, will be illuminated at any instant. As the machine continues to operate, successive increments of length of the work piece will be fed through this scanning field. Thus a change in current flow will be created in the circuit of each photo-tube from which the light is cut off at any instant, and provision is made for so utilizing these changes as to convert them into an expression of measurement of the scanned area.

Assuming that the machine is intended to measure sizeable pieces of work, such as patterns, leather, and other sheet materials, a convenient unit of measurement is one one-thousandth of a square foot (.001'). Assuming, also, that the particular machine shown is designed to handle work having a maximum width of four feet (4'), the scanning field may be assumed to be divided into equal units each one-twentieth of a foot wide (.05'), and the feed rolls may be driven at such a rate that an increment of length of the work piece equal to one-fiftieth (.02') of a foot will be in the scanning field at any instant. The counting system and its control circuit are so organized that one pulse will be generated and transmitted through to the counting system for each unit of area equal to $$\frac{1}{20} \times \frac{1}{50} = \frac{1}{1000}$$

of a square foot positioned in the scanning field at any instant. Thus in the particular machine illustrated there will be eighty (80) scanning lamps 16 and eighty (80) photo-tubes 23.

The counting system is like that shown and described in our earlier application above referred to and is illustrated in Figs. 7 and 8, but the control circuit for this system illustrated diagrammatically in Fig. 6, is quite different from that shown in said application. It will be observed that the entire series of photo-tubes 23, of which only three are illustrated in Fig. 6, are connected in parallel across a supply line including the conductor 32, on which a minus 75 volts is maintained, and a grounded conductor 33 which is at substantially zero potential. A resistance 34 is connected in series with each photo-tube. For the voltage here used the resistance may be in the order of 5 megohms. Also connected with each photo-tube is an amplifier including a tube 35 with suitable circuit connections. While various amplifying arrangements may be used, the drawings show one that has worked well, including a hot cathode gas tetrode No. 2051. The photo-tube may be of any suitable type, one that we have used satisfactorily being known commercially as CE–25–E.

Considering for the moment the extreme left-hand tube 35 shown in Fig. 6, it will be seen that the plate of this tube is connected to the conductor 36, carrying a plus 200 volts, the connection being made through two resistances 37 and 38 which may be in the order of, say, 5 and 1 megohms, respectively. The cathode is connected by the conductor 40 to the ground conductor 33, and it is also connected through a condenser 41 having a capacity of, say, .01 microfarad to a point 42 between the resistances 37 and 38. The control grid $c$ of the tube is connected directly with the anode of the photo-tube, while the shield grid or screen grid $d$ is connected by means of the conductor 43 with a stationary terminal 44 of a commutator or rotary contactor including the revolving arm 50. In addition, the conductor 43 is connected with a line 45 running to the negative terminal of a battery 46 or other source of direct current delivering, say, eight (8) volts, this connection being made through a resistance 47 which may be of the order of 5000 ohms.

It will be seen that with this arrangement when the photo-tube 23 is illuminated and the maximum current is therefore flowing through it, a very sizeable negative potential is applied at the point 48 and is transmitted to the control grid $c$. If, now, illumination is cut off the photo-tube, and its resistance consequently is increased very substantially, then the negative potential of grid $c$ is reduced so far that if, at the same time, the rotary contactor 50 should engage the terminal 44, thus short-circuiting the resistance 47 and connecting the shield grid $d$ directly to the ground, then the tube 35 will conduct strongly. This is a momentary or highly transitory condition lasting only an extremely small fraction of a second, but during it the condenser 41 discharges and a negative pulse is sent out to the line 52.

It should be observed that both the phototube 23 and the contactor 50 cooperate to control the conductivity of the electronic tube 35, each acting so to modify the potential of the grid with which it is connected as to produce the result just described. Normally this tube is not conducting but the phototube "conditions" it for conduction by lowering the potential of the control grid $c$, and the contactor "fires" or energizes the tube while it is so conditioned by raising the potential of the screen grid or shield grid $d$ from a minus value to ground potential, or zero, which is sufficient to make this type of tube conduct. These operations are repeated throughout the entire series of tubes 35 from which the light happens to be cut off while the contactor makes a single revolution. In the particular machine shown this entire cycle of operations is performed while the work is fed one-fiftieth of a foot through the scanning strip and it is repeated for each additional similar length of the work piece. Thus a pulse is sent from the plate of the tube 35 to the line 52 substantially simultaneously with the interception of a beam of light by each unit of area of the work piece.

This pulse is amplified in the portion C, Fig. 6, of the control circuit, the wave form is sharpened in the part D, and the amplified and sharpened pulse is sent through the conductor 84 to the counting circuit shown in Fig. 7. While it is thought that the action of the amplifying portion C of the circuit will be clear to those skilled in electronics, it may be pointed out that a negative pulse is transmitted from the condenser 51 to the control grid of the tube J. Normally this tube is conducting and its plate, therefore, is at a relatively low potential with reference to the ground. The strong negative pulse which comes in through the condenser 51 cuts off such conductivity momentarily, thus causing the plate potential at 81 to rise sharply. In this way a positive impulse is transmitted through the condenser 82 to the grid of the tube K.

As above stated, the purpose of the part D of the circuit is to increase the steepness of the positive impulse delivered to the counting circuit, since the operation of the latter is materially improved by a sharp or steep wave front. This portion of the circuit is not new with applicants, and it has been used heretofore in other relationships to produce essentially the same effect for which it is here employed. Accordingly, its operation need be described only very generally. The tube K, in effect, performs the functions of two entirely independent vacuum tubes. Considering them as K' and K", at a certain point in the cycle the cathode of K' is held sufficiently positive with respect to the potential of the grid by means of the potentiometer 83 so that K' is non-conducting. At this time the control grid of K" is biased positively so that this section of the tube will conduct well. This means that the potential of the anode is relatively low. Consequently, the moment a positive impulse is generated at the condenser 82 and is delivered to the grid of K', the latter tube becomes conducting and instantly causes K" to stop conducting. This results in a sudden rise of potential at the anode of K" and this impulse is carried into the counting circuit by the conductor 84.

The operations above described are repeated at each of the other photo-tubes 23 and the amplifying tubes 35 associated respectively with them, as the revolving contactor 50 energizes the respective amplifying tubes. Of course if any phototube is illuminated at the instant that its corresponding amplifying tube is energized, then no pulse will be transmitted from it to the counting circuit, such pulses being transmitted only from photo-tubes which are not illuminated due to the fact that the beams of light have been cut off from them by an interposed work piece. Thus only the scanned units of area will be integrated by the counting system.

Figure 10:
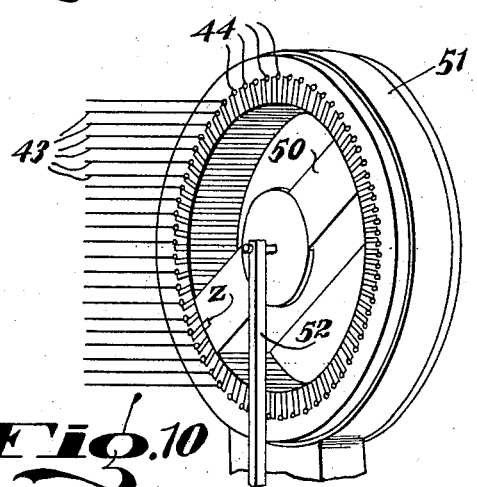
Fig. 10 is an angular view of the commutator forming part of the control circuit.

The rotary contactor 50 consists, in effect, of a commutator having stationary segments and a revolving contact, as shown for example in Fig. 10. The rotary element 50 carrying the contact $z$ is mounted directly on the shaft of the motor 14, Fig. 2, the various conductors 43 running from the respective amplifying tubes 35 being connected to the segments 44 in the commutator housing or body 51. Current is carried from the revolving contact $z$ through the arm 50 to an axial point where it is taken off through the conductor 52 and led to the ground.

The counting circuit shown in Fig. 7 is a ring arrangement to which power is supplied by the line 87. Between this power line and the ground line 88 a series of parallel shunts are connected, each including an electronic tube. Each tube controls the flow of current through an indicating element of some suitable type—in this case a neon lamp, these lamps being numbered from 0 to 9, inclusive. Suitable circuit connections are provided between adjacent tubes so that each tube, when conducting, automatically adjusts the grid bias of the next tube in advance of it so as to prime the latter tube and also to extinguish the preceding tube. This primed tube alone, because it has a lower grid bias than any other tube in the ring, will conduct when the next impulse comes into the ring. Thus successive pulses are transmitted, step by step, through the entire ring, the tubes firing in regular order and consequently operating the respective indicators in their regular turn.

The circuit organization will be readily understood by those familiar with electronic circuits. Impulses transmitted to the ring through the conductor 84 travel through the respective condensers 90 to junction points 91 and thence through resistances 92 to the grids of the repective tubes. Considering first the left-hand tube T₀ and assuming for the moment that it is conducting, the circuit arrangement is such with the voltages here indicated that the junction point 93 will be about 100 volts positive with reference to the ground. The point 94 will be about 90 volts negative with respect to the ground. The cathode of the tube T₁, and consequently the junction point 95, is in the neighborhool of 40 volts negative to the ground, and the grid connection of the third tube T₂ at 96 is about 140 volts negative. This makes the effective grid bias of the second tube T₁ only 50 volts, while the bias of the tubes T₂ and T₃ and those in the rest of the ring are all about 100 volts. With the pulse generating, amplifying, and triggering system above described a positive pulse of about 60 volts is delivered through the conductor 84 which is sufficient to make tube T₁ fire or become conducting, but it is not sufficient to cause any of the other tubes to operate. Such conductivity is set up in the tube T₁ in about one micro second and therefore a strong positive pulse is delivered backward through the condenser 91 to the point 93, thus causing the cathode of the first tube T₀ to be positive with respect to its plate for a long enough time to cause the ions in this tube to disappear. In other words, this tube, which has been conducting, is now rendered non-conducting, or is "extinguished."

After the tube T₁ becomes conducting, and in doing so stops the conductivity in the tube T₀, the third tube T₂ then becomes the one which is primed so that it will respond to the next positive pulse which comes in on the conductor 84. This positive pulse causes the third tube T₂ to conduct and this, in turn, stops the conductivity of the preceding tube T₁ and primes T₃. This operation continues indefinitely with the discharge into the circuit of successive pulses produced in the pulse generating circuit and permitted to be discharged therefrom in the manner above described.

Connected in parallel with the cathode resistor 98 of each tube is a neon lamp, those for the successive tubes being numbered from 0 to 9, respectively, as above stated. This resistor is made of such a value, say for example, ten thousand ohms, that the I. R. drop through it is in the neighborhood of 100 volts, which is sufficient to illuminate a neon lamp of, say, ¼ watt power.

As successive positive pulses come in on the conductor 84, they will cause the neon bulbs to light up in regular order, each lamp being extinguished as the next succeeding one lights, until the entire series has been so illuminated. This operation will be repeated so long as such pulses come in. That is, when the tube T₉ conducts T₀ becomes the primed tube and the following impulse, which will be the tenth, operates this tube. Succeeding pulses then operate this ring as before.

When conductivity of it first sets in, the rapid rise in potential at the point 99 is delivered through the conductor 100 to another ring having ten tubes and organized exactly like the counting ring shown in Fig. 7. Consequently, this conductor 100 delivers pulses to the second ring exactly as the conductor 84 delivers them to the first counting ring.

The second counting ring also delivers an impulse to a third ring every time that the ten neon lamps of the second ring have been lighted in their regular order, and additional rings may be so connected to any limit necessary for the particular counting operation to be performed. Each time ten pulses are received in any of these rings an impulse goes out to the next ring, causing it to shift one unit in the latter ring.

By arranging these lamps in the proper order, they may be made to read units, tens, hundreds, thousands, etc. Since the last lamp illuminated in each ring at the end of the count remains lighted indefinitely, this arrangement of rings gives a total count. For example, in Fig. 9 five such series of neon lamps are shown, one series for each of five counting rings. These rings are connected in the manner above described so that the right-hand series in Fig. 9 shows units, the second tens, the third hundreds, the fourth thousands, and the last ten thousands. If, for example, at the end of the measuring operation on a given skin, or other area to be measured, the lamps left burning are those checked in Fig. 9, then the indicated total would be 45376 units. If, as in this case, the units are thousands of a square foot, then the area measured is 45.376 square feet.

Perhaps it should be pointed out that for each positive pulse delivered from the condenser 82, Fig. 6, there always follows a negative impulse. This serves to cause the multivibrator circuit of the tube K to return to "normal" so that it is ready to accept the next positive impulse delivered to it.

At the conclusion of the measuring operation on a given piece of work or run of work pieces, the counting circuit is reset by closing the switch 89 which connects the junction point 91 with the ground and thus makes tube T₀ conduct with the result that any lamp in the ring which is holding the final count is extinguished, and the zero neon lamp is lighted. If now this switch is opened, conduction having been established in the tube T₀ and through the zero lamp, these elements will continue to conduct, and the ring thus will be primed for the next counting operation.

The same is true of the other counting rings in circuit with that shown in Fig. 7 and of course the resetting switches 89 for the respective rings can all be connected together mechanically for simultaneous operation.

It will be evident from the foregoing that this invention improves both the measuring methods and machines shown in our earlier patents and applications by simplifying the operations required and the apparatus necessary to perform the various steps of the methods. Since both the scanning lamps and the photo-tubes are stationary, the machine may be operated at speeds much higher than our earlier machines in which reciprocation of the scanning beam or its cooperating photo-tube, or both, are necessary. This fact also contributes materially to the simpler construction required. This is particularly true in the machine shown since the only moving parts in it are those required to feed the work and the revolving contactor 50.

While we have herein shown and described a preferred embodiment of our invention, it will be understood that the invention may be embodied in other forms without departing from the spirit or scope thereof.

Having thus described our invention, what we desire to claim as new is:

1. In an area measuring machine, the combination with a row of stationary photo-tubes arranged closely adjacent to each other, means for illuminating said tubes, said tubes and said illuminating means being spaced apart for the interposition of a work piece between them, said tubes being so positioned that they respond, respectively, to the illumination of equal units of a scanning area, said units cooperating to form a scanning strip of known length and of such a width as to extend across the entire width of the work piece, a counting circuit and a control circuit for said counting circuit, said control circuit including amplifying tubes operatively connected, respectively, with said photo-tubes so that changes in current from only those photo-tubes from which light is cut off will be transmitted to said counting circuit, and means for energizing said amplifying tubes in rapid succession.

2. In an area measuring machine according to preceding claim 1, a construction in which said energizing means includes a rotary contactor.

3. An area measuring machine according to preceding claim 1, including means for feeding a work piece through the beams of light delivered to said row of photo-tubes.

4. In an area measuring machine, the combination of means for producing a series of closely adjacent parallel stationary beams of light illuminating contiguous equal units of a scanning area in which a work piece may be positioned, a series of stationary photo-tubes positioned to receive said respective beams of light whereby when a work piece is fed between said means and said photo-tubes it cuts off the light from a number of said tubes depending upon the dimensions of the work piece, a circuit in which said tubes are connected, said circuit including means for creating pulses corresponding in number to the number of said tubes from which the light is so cut off, and means for counting said pulses and integrating the result into an expression of the scanned area of said work piece.

5. In an area measuring machine, the combination of means for producing a series of closely adjacent parallel stationary beams of light illuminating contiguous equal units of a scanning area in which a work piece may be positioned, a series of stationary photo-tubes positioned to receive said respective beams of light whereby when a work piece is fed between said means and said photo-tubes it cuts off the light at successive instants from a number of said tubes varying with the width of successive portions of the work piece, a circuit in which said tubes are connected and in which pulses are created corresponding in number to the number of said tubes from which the light is so cut off, said circuit containing a series of amplifying tubes connected with the respective photo-tubes, and a rotary contactor for energizing said amplifying tubes successively to create said pulses.

6. In an area measuring machine, the combination of means for producing a row of closely adjacent parallel stationary beams of light, a row of stationary photo-tubes positioned to receive said respective beams of light, mechanism for feeding a work piece through said beams of light and thereby cutting off the light from different numbers of said photo-tubes varying with the number of units of area in successive equal increments of length of said work piece, said beams serving to illuminate contiguous equal units of area of the work piece, an electric circuit in which said photo-tubes are connected, and means cooperating with said photo-tubes and said circuit for integrating the units of area in said successive increments of length into an expression of the area of the surface so fed through said beams.

7. In an area measuring machine, the combination of means for producing a row of closely adjacent parallel stationary beams of light, a row of stationary photo-tubes positioned to receive said respective beams of light, mechanism for feeding a work piece through said beams of light and thereby cutting off the light from different numbers of said photo-tubes varying with the number of units of area in successive equal increments of length of said work piece, said beams serving to illuminate contiguous equal units of area of the work piece, an electric circuit in which said photo-tubes are connected, and means for counting said units of area in said successive increments of length of said work piece, including an electric circuit and a rotary contactor therein cooperating with said phototubes from which the light is cut off by the units of area in said increments to create pulses in said circuit corresponding to said units of area.

8. In an area measuring machine, the combination of means for producing a row of closely adjacent parallel stationary beams of light, a row of stationary photo-tubes positioned to receive said respective beams of light, mechanism for feeding a work piece through said beams of light and thereby cutting off the light from different numbers of said photo-tubes varying with the number of units of area in successive equal increments of length of said work piece, said beams serving to illuminate contiguous equal units of area of the work piece, an electric circuit in which said photo-tubes are connected, an amplifier in circuit with each photo-tube and individual thereto, means for successively energizing the amplifiers during the feeding of each of said increments of length of the work piece through said beams, and a counting system with which said amplifiers are connected and operable in response to variations in current flow produced by said energizing of the amplifiers and the act of cutting light off the photo-tubes by the work piece during the scanning of said successive increments of length of the work piece to integrate said units of area into an expression of the area of the surface of said work piece.

9. In an area measuring machine, the combination of means for producing a row of closely adjacent parallel stationary beams of light, a row of stationary photo-tubes positioned to receive said respective beams of light, two pairs of feed rolls located, respectively, at opposite sides of said row of beams and adapted to feed a work piece through said beams of light and thereby to cut off the light from different numbers of said photo-tubes varying with the number of units of area in successive equal increments of length of said work piece, said beams serving to illuminate contiguous equal units of area of the work piece forming strips of the surface of the work piece extending width-wise thereof, an electric circuit in which said photo-tubes are connected, whereby changes in current flow are created in said circuit by the changes in illumination of said tubes, an amplifier tube in circuit with each photo-tube and individual thereto for amplifying the changes in current flow produced in the respective photo-tubes, a rotary contactor connected in said circuit for energizing said amplifiers successively during the feeding of each of said increments of length of the work piece through said beams and thereby producing pulses corresponding to the number of phototubes from which the light is cut off, means for driving said contactor in a definite speed relationship to that of said feed rolls, and a counting system to which said amplified pulses are transmitted, said counting system serving to integrate said amplified pulses into an expression of the area of the surface of said work piece.

10. In an area measuring machine according to preceding claim 9, a construction in which said rolls are positioned horizontally and the pairs of rolls are spaced apart horizontally and said beams of light are directed vertically through said horizontal space, in combination with means for shielding the tubes from beams cooperating with adjacent photo-tubes.

11. In an area measuring machine, the combination of a scanning apparatus comprising a series of stationary scanning units supported side by side and cooperating to define a scanning field, each of said units including a photo-tube responsive to a beam of light illuminating a unit area in said field, a circuit in which said tubes are connected, a counting system cooperating wth said circuit to utilize variations in currents flowing through said tubes to integrate the results of the scanning operation into an expression of area measurement and electrical switching means cooperating with said photo-tubes to control the operation of said counting system.

12. In an area measuring machine, the combination of a scanning apparatus comprising a series of stationary scanning units supported side by side and cooperating to define a scanning field, each of said units including a photo-tube and an electric lamp positioned in cooperative relationship to said tube and adapted to illuminate a unit area of said scanning field, a circuit in which said tubes are connected, a counting system associated with said circuit and operative to utilize variations in the currents flowing through said tubes to integrate the results of the scanning operation into an expression of area measurement, and electrical switching means cooperating with said photo-tubes to control the operation of said counting system.

JOHN L. JONES.
JAMES W. FARMER.